United States Patent [19]

Nishikawa et al.

[11] Patent Number: 5,296,945
[45] Date of Patent: Mar. 22, 1994

[54] VIDEO ID PHOTO PRINTING APPARATUS AND COMPLEXION CONVERTING APPARATUS

[75] Inventors: Masaji Nishikawa, Tokyo; Junichi Ishibashi, Iruma; Toshiyuki Ebihara, Tokyo, all of Japan

[73] Assignee: Olympus Optical Co., Ltd., Tokyo, Japan

[21] Appl. No.: 843,439

[22] Filed: Feb. 28, 1992

[30] Foreign Application Priority Data

Mar. 13, 1991 [JP] Japan .................................. 3-48307
Nov. 28, 1991 [JP] Japan ................................ 3-314512

[51] Int. Cl.⁵ .......................................... H04N 1/46
[52] U.S. Cl. .................... 358/518; 358/523; 358/501; 358/538
[58] Field of Search ............ 358/903, 909, 523, 518, 358/524, 538, 501, 75, 80, 76, 78

[56] References Cited

U.S. PATENT DOCUMENTS

| | | | |
|---|---|---|---|
| 4,189,744 | 2/1980 | Stern | 358/903 |
| 4,689,669 | 8/1987 | Hoshino et al. | 358/76 |
| 4,707,119 | 11/1987 | Terashita | 358/76 |
| 4,792,847 | 12/1988 | Shimazaki et al. | 358/80 |
| 4,956,704 | 9/1990 | Yamada | 358/80 |
| 4,958,217 | 9/1990 | Kimura et al. | 358/78 |
| 5,128,711 | 7/1992 | Terashita | 358/76 |
| 5,155,588 | 10/1992 | Levien | 358/80 |
| 5,181,105 | 1/1993 | Udagawa | 358/80 |

FOREIGN PATENT DOCUMENTS 63-316275 12/1988 Japan.

Primary Examiner—Edward L. Coles, Sr.
Assistant Examiner—Fan Lee
Attorney, Agent, or Firm—Frishauf, Holtz, Goodman & Woodward

[57] ABSTRACT

Video ID photo printing apparatus corrects the complexion of a person serving as an object into a desired color without any influences caused by controlling an illumination light source and the various control section of a video image pickup apparatus, printer characteristics, and the like. In order to extract the complexion data of the person serving as an object photographed by a color TV camera, a skin-color portion in a face image is detected by a detection point setting unit. A comparator compares the detected data value with a data value of a desired standard skin color formed in advance and stored in a standard color memory. The skin color of the picked up face image is converted into a desired skin color by a look-up table in accordance with a comparison result, and the data of the desired skin color is written in a frame memory. Thereafter, the face image which is subjected to color conversion is printed by a full-color printer.

8 Claims, 9 Drawing Sheets

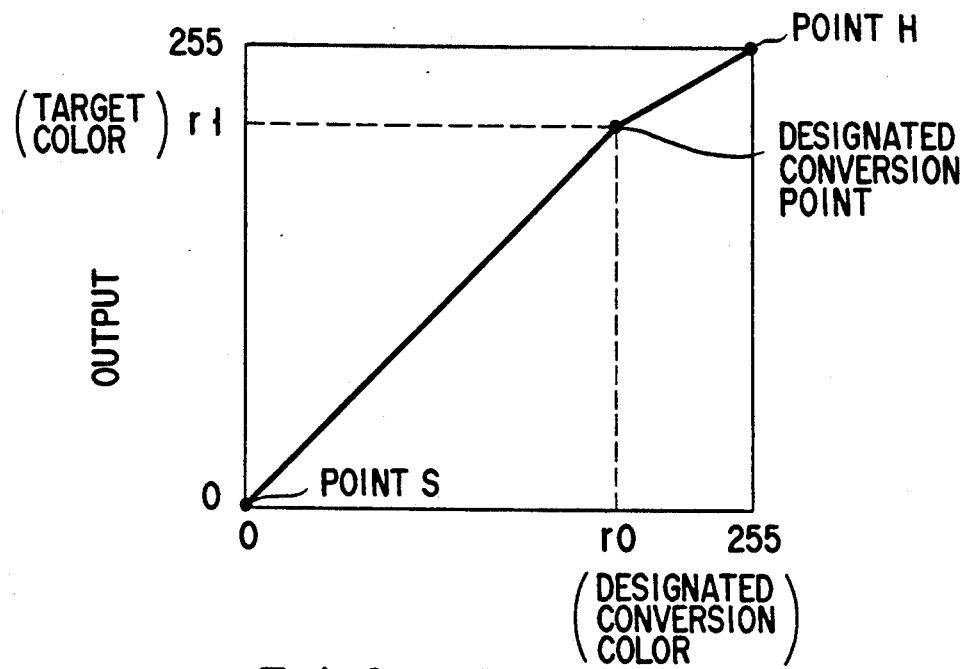
F I G. 3
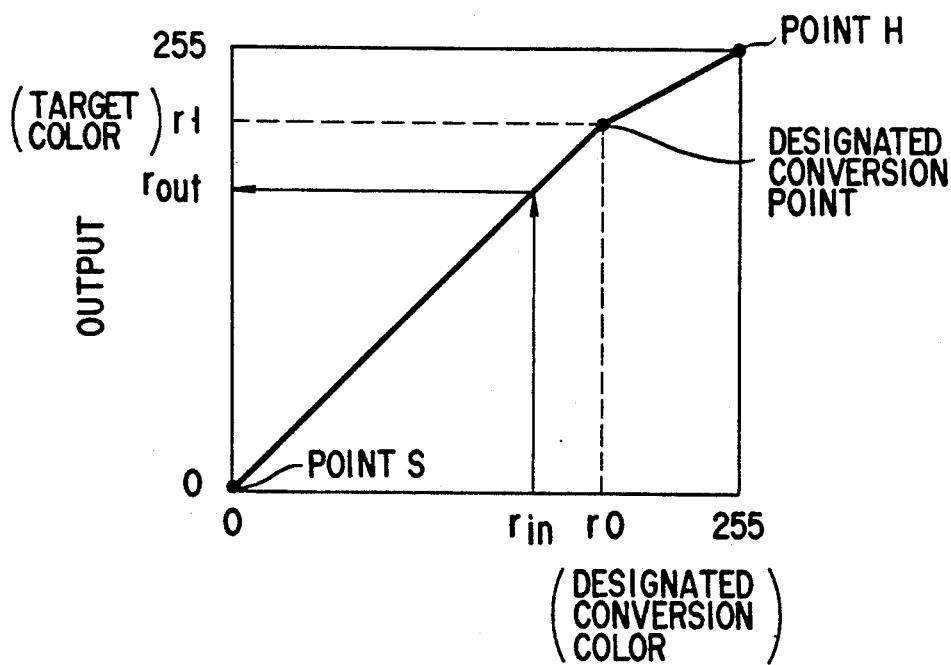
F I G. 4

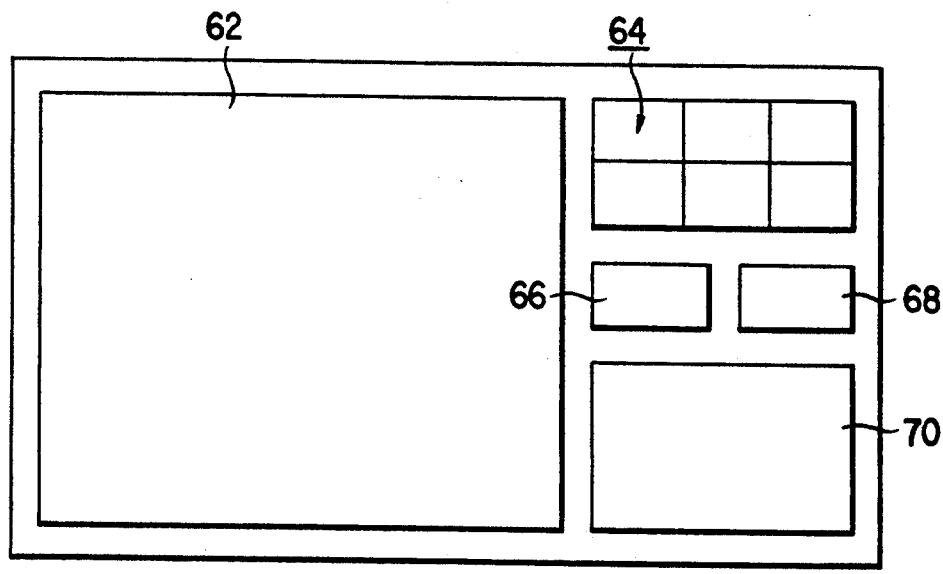
F I G. 5
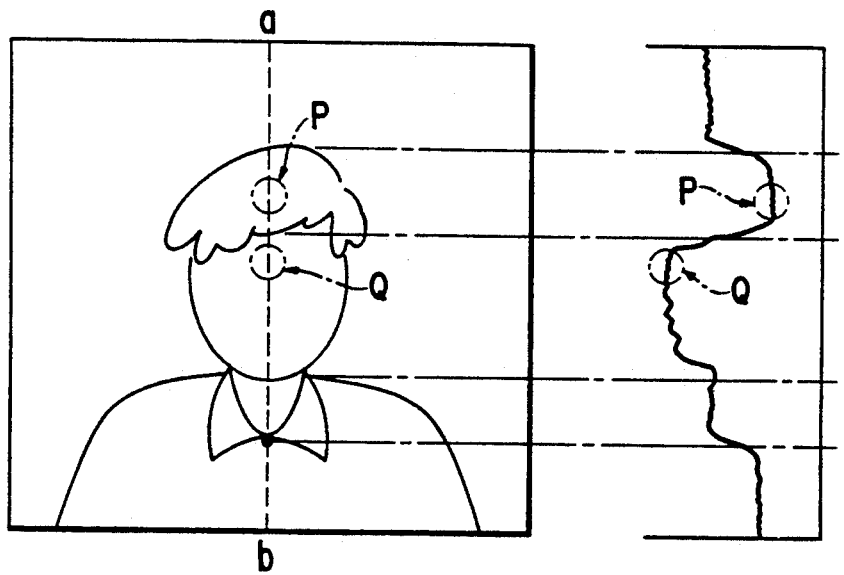
F I G. 6A            F I G. 6B

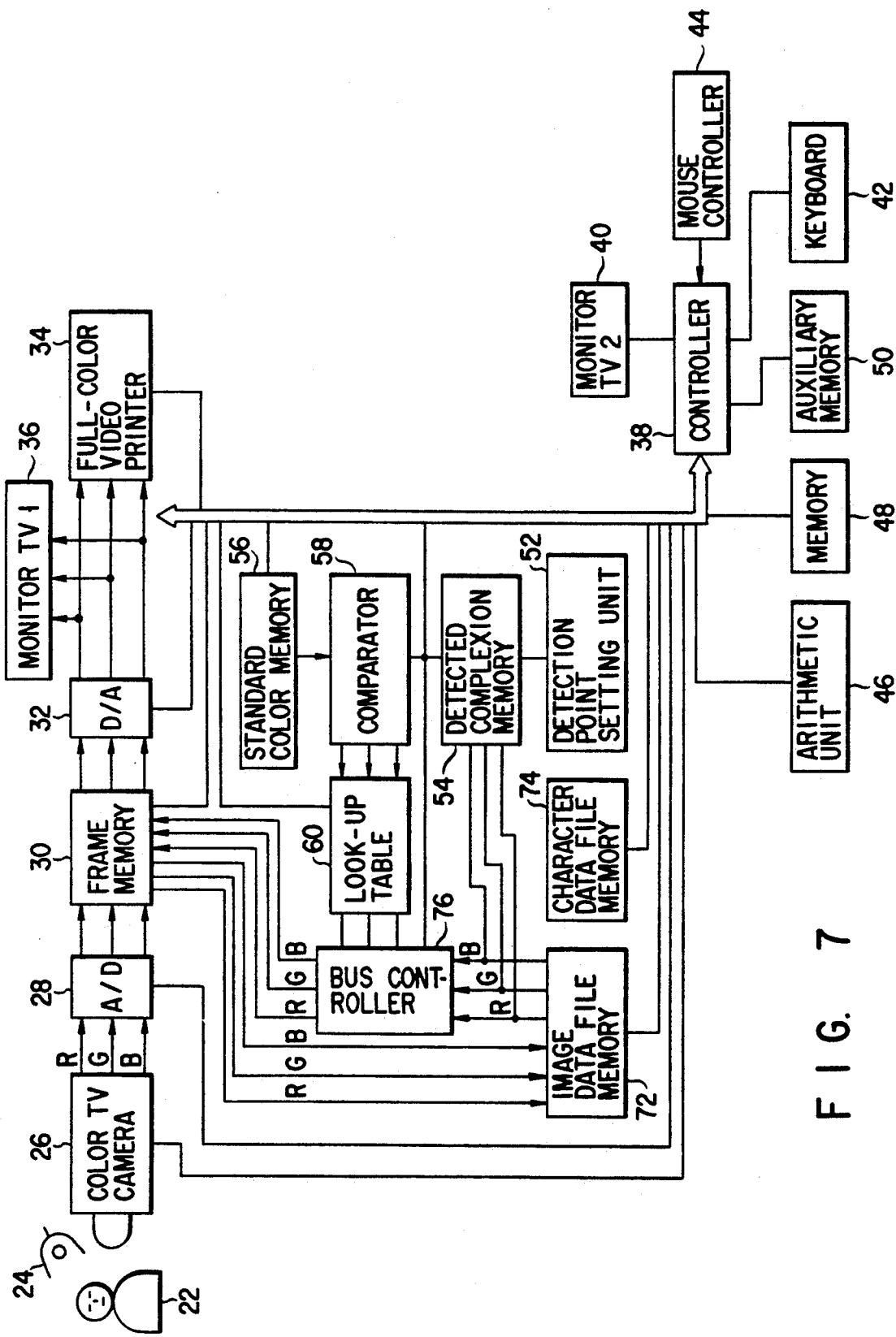
F I G. 7

VIDEO ID PHOTO PRINTING APPARATUS AND COMPLEXION CONVERTING APPARATUS

BACKGROUND OF THE INVENTION

1. Field of the Invention

The present invention relates to a video photo system and a complexion converting apparatus and, more particularly, to a video ID photo printing apparatus and a complexion converting apparatus capable of correcting or converting the complexion of a person as an object into a desired color.

2. Description of the Related Art

In a known apparatus, an ID photo print is printed out by a full-color video printer on the basis of a portrait image signal received by a video image pickup apparatus or is stored in a filing device and arbitrarily read to be displayed on a monitor or printed out.

FIG. 1 is a block diagram of a video ID pickup apparatus disclosed in Published Unexamined Japanese Patent Application No. 63-316275. In FIG. 1, a face image of a person 2 as an object is picked up by a color television (TV) camera 4 to obtain an RGB signal. The RGB signal is converted into a digital signal by an A/D converter 6 and temporarily stored in a frame memory 8. The image data stored in the frame memory 8 is calculated by an image processor 10 having a look-up table memory 10a, a look-up table 10b, an adder 10c, and the like to remove a color impurity caused by incorrect spectral light-absorbing factors of a color medium.

Image data output from the image processor 10 is supplied to a full-color video printer 12 having a look-up table memory 12a, a video RAM 12B, a D/A converter 12c, a selector 12d, a CRT controller 12e, a CRT display 12f, a printing unit 12g, a development process unit 12h, and the like. In FIG. 1, reference numeral 14 denotes a controller for controlling the system as a whole. The controller 14 controls a memory 16, a keyboard 18, a floppy disk 20, and the like.

In an ID card printing apparatus with the above arrangement, a full-color image obtained by synthesizing and editing a picked up video image and a graphic image electrically produced at the portion of the controller 14 is printed out by the video printer 12.

In the above video ID photo printing apparatus, it is important that a printed complexion of a person is optimal and that an operation and handling for keeping the complexion optimal are easily performed.

Reproduction of a complexion is influenced by an illumination light source, controls of adjusting means of the video image pickup apparatus, and printer characteristics of the video printer. More specifically, when a photo studio is not used, the optical quality of an illumination is largely changed. The number of portions to be controlled of video image pickup equipment such as a color TV camera is increased. In addition, an image observed through a monitor and a printed image are largely different from each other in impression. In addition, a long time is required for printing the image. For this reason, it is very difficult to perform the adjusting operation.

An apparatus of this type is used by professionals specializing in card formation, and the above difficulty is overcome. However, when cards are unusually formed by ordinary persons, the stability and maintenance of reproduction of a complexion are very difficult. Therefore, operations for stabilizing and maintaining the reproduction are very complicated and require a long time.

SUMMARY OF THE INVENTION

It is an object of the present invention to provide a video ID photo printing apparatus and a complexion converting apparatus capable of stabilizing picture quality on a print or a monitor without being influenced by an illumination light source, controls of control means of a video image pickup apparatus, and printing characteristics of a video printer and without requiring very difficult controlling operations of video image pickup equipment.

It is, therefore, an object of the present invention to provide a video ID photo printing apparatus comprising video image pickup means for photographing an object to be photographed to output a video original image signal, extracting means for extracting complexion data from the video original image signal obtained by a photographic operation performed by the video image pickup means, comparing means for comparing the complexion data extracted by the extracting means with predetermined standard complexion data, complexion conversion arithmetic means having a parameter determined by a comparison result obtained from the comparing means, and a full-color video printer for performing a video printing operation on the basis of an image signal of a video image obtained by converting and calculating operations performed by the complexion conversion arithmetic means.

It is another object of the present invention to provide a complexion converting apparatus comprising video image pickup means for photographing an object to be photographed and outputting a video original image signal of a face portion of the object, extracting means for extracting complexion data from the video original image signal obtained by a photographic operation performed by the video image pickup means, standard color storing means in which a plurality of standard complexion signals are stored, designating means for selectively designating one of the standard colors every picked up face image, comparing means for comparing the complexion data extracted by the extracting means with selected standard color data, and complexion conversion arithmetic means having a conversion parameter of a video image output by a comparison result obtained from the comparing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a graph for explaining a characteristic line of a look-up table in FIG. 2;

FIG. 4 is a graph for explaining a characteristic line of the look-up table in FIG. 2;

FIG. 5 is a view showing a screen displayed on a monitor TV in FIG. 2;

FIG. 6A is a view showing a face image subjected to automatic extraction of a designated conversion color;

FIG. 6B is a view showing a brightness distribution of the image on a dotted line a - b in FIG. 6A;

FIG. 7 is a block diagram showing an arrangement of a video ID photo printing apparatus according to the second embodiment of the present invention;

DETAILED DESCRIPTION OF THE PREFERRED EMBODIMENTS

Embodiments of the present invention will be described below with reference to the accompanying drawings.

Figure 1:
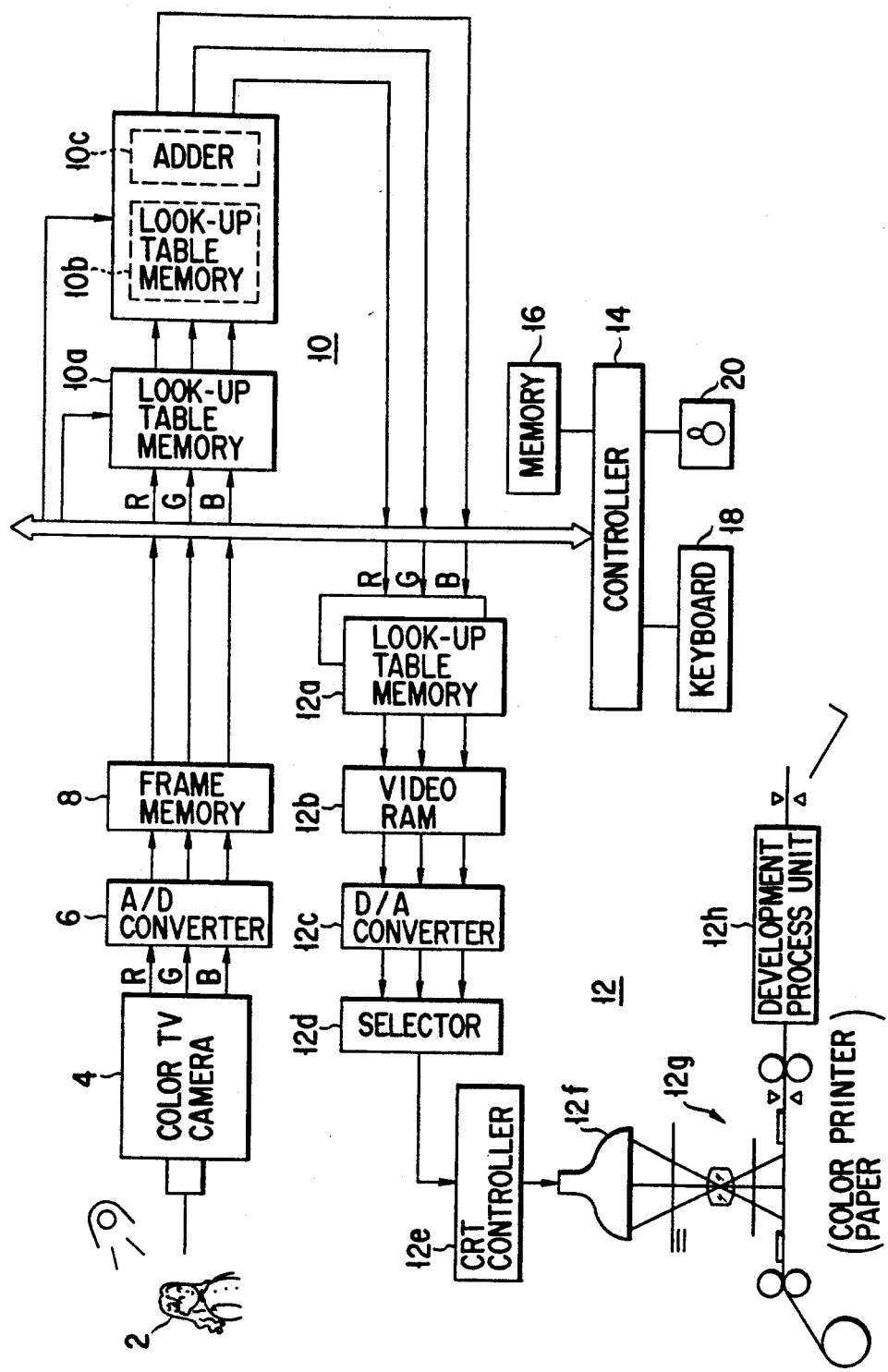
FIG. 1 is a block diagram showing a conventional video ID photo apparatus.
Figure 2:
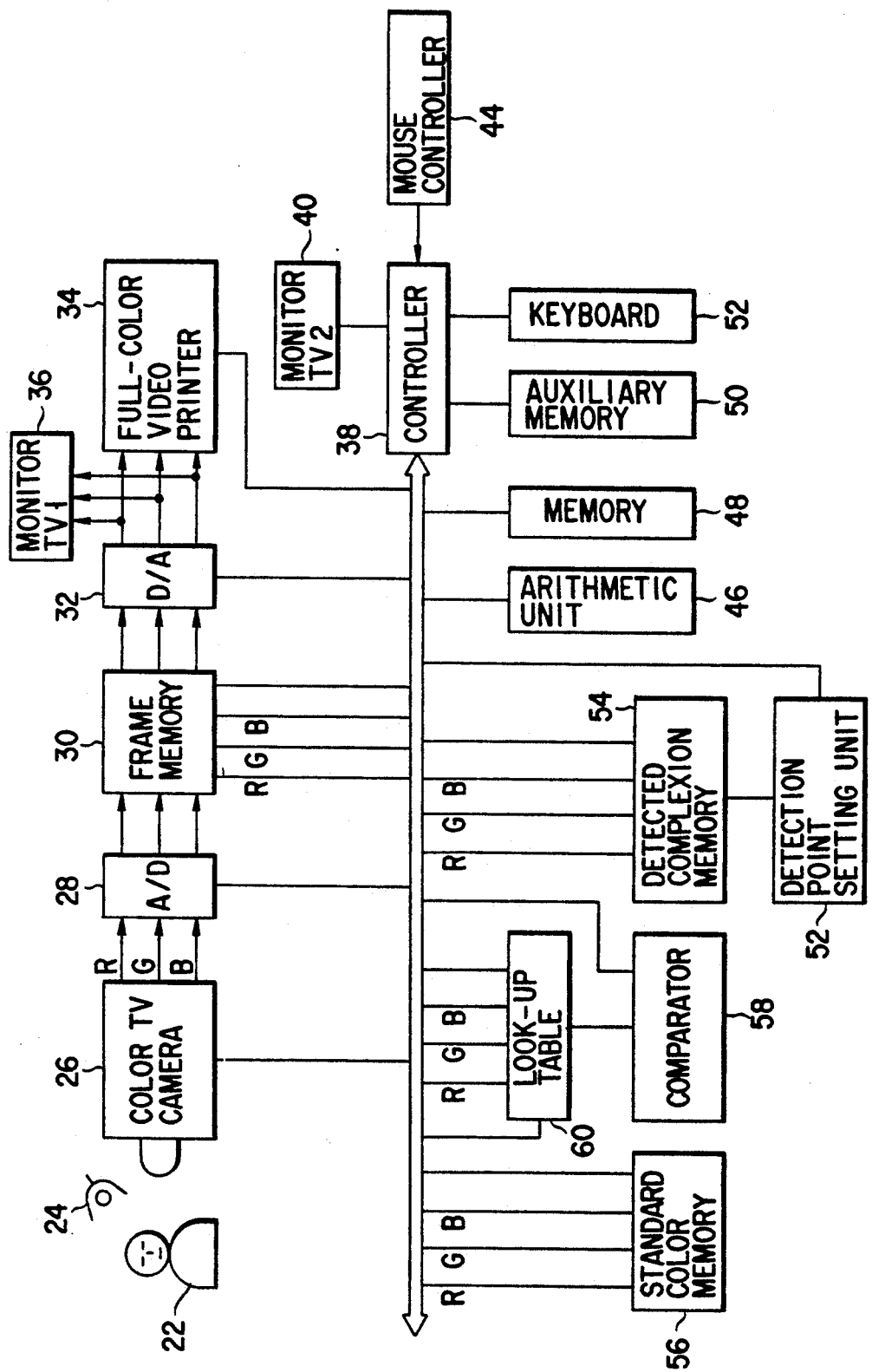
FIG. 2 is a block diagram showing an arrangement of a video ID photo printing apparatus according to the first embodiment of the present invention.

FIG. 2 is a block diagram showing an arrangement of a video ID photo printing apparatus to which the present invention is applied. In FIG. 2, during a photographic operation, light is radiated on a person 22 serving as an object from an illumination light source 24. When a color TV camera 26 photographs the upper-half body of the person 22, analog data R, G, and B obtained by this photographic operation are converted into digital data by an A/D converter 28. Thereafter, the converted data are stored as a frame image in a frame memory 30.

Digital signals from the frame memory 30 are converted into analog video signals by a D/A converter 32. The converted signals are output to a full-color video printer 34 for outputting an ID card print and a monitor TV 36 for monitoring an image stored in the frame memory 30. Note that reference numeral 38 is a controller for controlling the apparatus as a whole, and a monitor TV 40 is connected to the controller 38 to observe a control state or to temporarily monitor an image.

The controller 38 is connected to a keyboard 42 used when an operator instructs the apparatus to operate and inputs numerical data, a mouse controller 44 for indirectly instructing an image portion and for instructing a computer to operate, an arithmetic unit 46 for performing various image process calculations, a memory 48 for temporarily storing image data or calculation data during a calculating operation, an auxiliary memory 50 including a floppy disk, a hard disk, an optical magnetic disk, and the like which are used for storing image data or control programs. The operations of the keyboard 42, the mouse controller 44, the arithmetic unit 46, the memory 48, and the auxiliary memory 50 are controlled by the controller 38.

A detection point setting unit 52 for designating a skin portion in a face image to extract complexion data from the face image, a detected complexion memory 54 for detecting complexion data by this setting and temporarily storing the complexion data, a standard color memory 56 in which a plurality of preformed desired standard skin color data are stored, and a comparator 58 for comparing differences of values of the color data in the detected complexion memory 54 and the standard color memory 56 are connected to the signal bus of the controller 38. Reference numeral 60 denotes a color converting look-up table for converting the skin color of the picked face image into a desired skin color. The look-up table 60 is formed on the basis of a data value obtained by the comparator 58. The above elements are operated by the controller 38.

An operation of this embodiment will be described below.

A photo image of an upper-half body of the person 22 including his face is picked up by the color TV camera 26. At this time, light having an appropriate amount of light is radiated from the illumination light source 24 not to darken the image of the face portion. On the color TV camera 26 side, white balance control, aperture control of a lens, and focus control which are not shown are performed in advance. The analog video signals R, G, and B from the color TV camera 26 are converted into digital signals by the A/D converter 28 and sequentially stored in the frame memory 30.

The digital data stored in the frame memory 30 are sequentially read in synchronism with each other to be output as video signals, and they are converted into an RGB signal by the D/A converter. At this time, when the converted signal is input to the monitor TV 36, the upper half image of the person 22 can be monitored. The illumination light source 24 and the color TV camera 26 are controlled such that a face image can be picked up while the image of the monitor TV 36 is monitored.

For example, in order to pick up a face image used for an ID card or the like, image data in photographing is stored in the frame memory 30. In this case, in order to freeze a face image in the frame memory 30, a control signal is output from the controller 38 to the frame memory 30. An operator performs a key input operation by using the keyboard 42 to perform this freezing operation.

The controller 3 sequentially stops write data address counters and causes the frame memory 30 not to be write accessible such that the controller 38 receives the key input to freeze the face image. However, when the operation on a read address side is continued, the image data stored in the frame memory 30 are D/A-converted regardless of the presence/absence of the freezing operation, and the moving or still picture of a camera image can be monitored on the monitor TV 36.

In order to record and store the still image of the face of the person 22, the image data stored in the frame memory 30 are transferred and recorded in the auxiliary memory 50. This operation will be described below.

Pixel unit data of image data of R, G, and B colors in the frame memory 30 are read by the controller 38. The data are sequentially transferred to the auxiliary memory 50 through the data bus. In the auxiliary memory 50, the data are sequentially recorded on a recording medium. At this time, the recording medium is set such that file name data, image information data, and the like can be recorded in a file format. For example, file names or the like are input as follows. The input file name data and the like are converted into data which can be recorded by an operator through the keyboard 42, e.g., ASCII-coded data. Thereafter, the converted data are recorded in the auxiliary memory 50 by the controller 38.

When the recorded and stored face image data are to be read out, the file name data of an image required by an operator is input with the keyboard 42, the controller 38 searches and reads image data from the auxiliary memory 50 in accordance with the file name data. The read data are sequentially written in the frame memory 30 through the data bus every color and every pixel. The data written in the frame memory 30 are output as one image in the same process as described above and printed by the full-color video printer 34, or can be visually recognized as an image through a CRT display of the monitor TV 36.

Image data of an ID card print requires character data, CG image data, and the like, other than the face image data. The character data are input such that an operator enters a name, an ID number, and the like by using the keyboard 42 Vector photo forming processing or the like is performed by the arithmetic unit 46 as needed. In addition, the character data are recorded in the auxiliary memory 50 and stored in a file format to be referred to the face image.

The CG image such as a graphic image is picked up and prepared in the same manner as that of the face image data such that image data formed by single-purpose equipment in advance are recorded and prepared in the auxiliary memory 50 and that a graphic image is picked up by the color TV camera 26 Alternatively, a CG formation program is operated, and a CG image is formed in the frame memory 30 and then recorded and stored in the auxiliary 50.

The image having a converted complexion and other images which are prepared as described above are synthesized and edited on the frame memory 30, and the synthesized image data constituting one frame is used as an ID card image. After this image data are converted into a video signal by the D/A converter 32, the image data are input to the full-color video printer 34. When a printing operation is started in response to a designating signal from the controller 38, an ID card image is printed out.

A basic operation performed when the complexion of the face image is converted will be described below.

Although the skin color of the face of the person 22 is recognized by monitoring the CRT display (not shown) of the monitor TV, this color is different from a color recognized by a color represented on the print of the full-color video printer 34. The skin color expressed in this case is determined by the color balance of the color TV camera 26, the color generation of the monitor TV 36 and the full-color video printer 34, the balance of colors, some distortion in a transmitting system, the tone of the illumination light source 24, and the like.

It is well-known that a color balance is obtained by the illumination light source 24 and the color TV camera 26. In the full-color video printer 34 or the monitor TV 36, balance of colors, e.g., signals R (red), G (green), and B (blue) can be controlled. In this apparatus, there is the frame memory, as a portion in which a change in color can be arbitrarily controlled. That is, when the input data values of the signals R, G, and B are changed to be input to the frame memory 30 again, expression colors of the monitor TV 36 can be changed.

In this embodiment, the R, G, and B colors of the image stored in the frame memory 30 are converted by a complexion conversion arithmetic circuit (to be described later), such that the image having a preferable complexion can be output. The image in the frame memory 30 during the calculating operation is set to be a still (frozen) image obtained during a photographic operation, or an image obtained by reading an image stored in the auxiliary memory 50 upon the photographic operation.

Color data of the face portion must be load to extract the complexion data of the image. For this purpose, an address of a face portion to be extracted is designated for the frame memory 30 by the controller 38. When this address is set, R, G, and B data of the frame memory 30 are read out. The designation of the face portion to be extracted is performed by using the mouse controller 44, a cursor is displayed on the screen of the monitor TV 36 or 40, and the cursor is shifted such that this display and the frame memory address are related to each other. The cursor is shifted along the face portion on the screen of the monitor TV 36 or 40. At this time, when an extraction point is determined, the button of the mouse controller 44 is clicked, or an operator performs a key input operation by the keyboard 42. In this manner, the R, G, and B data on the address are read and stored in the detected complexion memory 54.

This designation of the face portion may be designated by a method of designating complexion data extraction (to be described later) in advance. In this case, a predetermined address value is input to the detection point setting unit 52, and R, G, and B data on the frame memory 30 at this address are read and stored in the detected complexion memory 54.

In contrast to the extracted complexion data, a set of data designated in advance or a set of data designated from the R, G, and B data of a plurality of desired skin colors are stored in the standard color memory in advance, or the standard color data stored in the auxiliary memory 50 in advance are read by the controller 38 and stored in the standard memory 56 through the data bus. A look-up table 60 used for converting the extracted complexion data into a desired skin color is formed by the controller 38 in the method (to be described later) after the R, G, and B data stored in the detected complexion memory 54 and the R, G, and B data stored in the standard color memory 56 are compared with each other.

After the look-up table is formed, image data in the frame memory 30 are read out in units of pixels, and the respective color densities are converted in accordance with the look-up table 60 and written at the same address of the frame memory 30 as described above so as to be converted into a face image having a desired skin color. This operation is performed by the controller 38, and this operation is performed every time the person 22 is changed. If one desired skin color is used, the data of the standard color memory 65 need not be updated.

In the above description, as a video image inputting apparatus, in addition to a video TV camera, a still video camera or the like using a floppy disk memory or a semiconductor card memory may be used. When complexion data is to be extracted, a plurality of position data are extracted and averaged to prevent sampling errors as a matter of course. In addition, it is convenient to arbitrarily designate a standard complexion and to select several values in accordance with races and sexes.

A calculating operation of extracted complexion data, e.g., a method of calculating and converting a complexion, will be described below with reference to FIG. 3.

Each pixel signal is constituted by a luminance signal corresponding to one of the three colors, i.e., R, G, and B. A value of the signal level of each pixel falls within a range of 0 to 255, the signal level 0 represents a minimum luminance, and the signal level 255 represents a maximum luminance. At this time, characteristics of color conversion are designated by two colors. One is color data extracted from portrait data and is called a designated conversion color, and the other is color data arbitrarily designated and is called a target color.

The designated conversion color is extracted from the portrait data. Color conversion is performed using this designated conversion color as a center. The designated conversion color is extracted from the face portion of the portrait data. In the face, the color is preferably extracted from a portion such as a cheek or the forehead which determines the impression of the complexion. In addition, the signal levels of the three colors, i.e., R, G, and B, of the designated conversion color are set to be r0, g0, and b0, respectively.

A standard color (target color) serving as a target is determined. A color suitable for the portion (cheek, forehead, or the like) from which the designated conversion color is extracted is designated as the target color. The signal levels of the three colors, i.e., R, G, and B, of the target color are set to be r1, g1, and b1, respectively.

A conversion table is formed by the designated conversion color and the target color. The three colors, i.e., R, G, and B are independently converted. The look-up tables 60 are independently formed for the three colors.

Although the color R will be described below, since each of the two remaining colors has the same look-up table 60 as that of the color R, the description of the two remaining colors will be omitted.

A this time, the following terms are defined for the description.

Point S: a point in the look-up table for converting an input luminance signal level 0 into an output luminance signal level 0 (S represents shadow).

Point H: a point in the look-up table for a input luminance signal level 255 into an output luminance signal level 255 (H represents highlight).

Designated conversion point: a point on the look-up table for converting r0 of an input luminance signal level into r1 of an output luminance signal level.

The characteristic line of the look-up table is calculated as follows. When an input signal level x is given as $$0 \leq x \leq r0$$

an output signal level y is given as $$y = x \cdot r1/r0$$

When the input signal level x is given as $$r0 \leq x \leq 255$$

the output signal level y is given as $$y = (x - r0) \cdot (255 - r1)/(255 - r0) + r1$$

That is, as shown in FIG. 3, the characteristic line of the look-up table is represented by a polygonal obtained by sequentially connecting the point S, the designated conversion point, and the point H.

The luminance signal level of each pixel is converted by the look-up table formed as described above. According to this conversion, since the output of a pixel having luminance 0 is set at luminance 0, it is found that the luminance of a shadow portion is not changed. Since the output of a pixel having luminance 255 is set at luminance 255, it is found that the luminance of a highlight portion is not changed. In addition, since the designated conversion color r0 is changed into the target color r1 and output, the color of the cheek, forehead, or the like from which the designated conversion color is extracted becomes a color completely suitable for the cheek, forehead, or the like.

An input luminance signal $r_{in}$, as shown in FIG. 4, is output as a signal $r_{out}$. As the signal $r_{in}$ is close to the luminance signal of the designated conversion color, the signal $r_{out}$ is close to the luminance signal of the target color. In contrast to this, as the signal $r_{in}$ goes away from the luminance signal of the designated conversion signal, an amount of change in luminance of the signal $r_{out}$ caused by conversion is decreased, and the original luminance can be kept. With this operation, natural color conversion can be performed using a target color as a center.

A characteristic curve in which the same effect as described above can be obtained may be used in place of the characteristic line of the look-up table.

A method of extracting complexion data by designating coordinates on the monitor will be described below.

In order to designate a place for extracting the designated conversion color in face image data, a pointing device such as a mouse controller and a digitizer (tablet) is conventionally used (a touch panel, a track ball, a joy stick, or the like can be used). When the above devices are used, not only the extraction of the designated conversion color but various handling operations can be designated, thereby improving operability.

An example in which a mouse controller is used will be described below.

When color conversion is interactively performed using a mouse controller in a computer, for example, the screen shown in FIG. 5 is used. In FIG. 5, reference numeral 62 denotes a portrait information display section; 64, a standard color display section; 66, a designated conversion color display section; 68, a target color display section; and 70, a menu. In this menu 70, commands such as loading (readout from the auxiliary memory 50) of face image data, saving (writing in the auxiliary memory 50), and color conversion execution are prepared. On this screen, a cursor (not shown) indicating an operating position of the mouse controller is displayed. This cursor is shifted on the screen in accordance with the movement of the mouse controller on a desk.

When the load of the face image data is selected from the menu 70, a face image serving as an object of color conversion is displayed on the screen. The selection of a target image may be performed by operating the keyboard 42 belonging to the computer. However, when the computer is set such that a list of the names of employees and ID numbers are displayed on the screen, the selection can be performed by only the mouse controller. In order to extract a designated conversion color, the cursor of the mouse controller is shifted to an arbitrary position on the face image, and a click operation of the mouse is performed under the control of the mouse controller. The designated conversion color extracted by the operation is displayed on the designated conversion color display section 66.

A target color is selected from the standard color display section 64. In order to select the target color, the cursor under the control of the mouse controller is shifted to an arbitrary position of the standard color display section 64, a click operation of the mouse is performed under the control of the mouse controller. The standard color extracted by this operation is displayed on the target color display section 68. A plurality of colors suitable of the target color are prepared for the standard color display section in advance, and these colors can be displayed by symbols such as characters and numbers or by colors themselves when a color monitor is used. For example, face images representing the male sex and the female sex complexion data can be selectively used depending on a male face image or a female face image. In addition, when a new standard color is additionally registered, the color can be used in the same manner as that of the target color which is prepared in advance.

At this time, start of color conversion is selected from the menu 70 by the mouse controller. The computer forms a look-up table for performing color conversion in accordance with the designated conversion color extracted from portrait information and the target color selected from the standard color display section 64. Subsequently, the luminances of all pixel data of the face image are converted by this look-up table. In addition, saving of face image data is selected from the manu 70 as needed, and the face image data upon color conversion is written in the auxiliary memory 50.

A method of extracting complexion data when the coordinates are designated in advance will be described below.

When the position of the face image is standardized, and parts (cheek, forehead, and the like) each having an important complexion are located at fixed positions, coordinates for extracting the designated conversion color can be determined in advance. In addition, when the face position is not fixed, the designated conversion color can be automatically extracted by causing the computer to discriminate the face position.

For example, a method of extracting the color of a forehead portion in a face image will be described below. FIG. 6A shows a face image in which a designated conversion color is to be automatically extracted. FIG. 6B shows the luminance distribution of the image on a dotted line a - b in FIG. 6A. Although a luminance of any one of the colors, i.e., R, G, and B, is used, an appropriate luminance is preferably selected in consideration of the characteristics of the image. The dotted line a - b may be located at a position such that the screen shown in FIG. 6A is divided into right and left parts.

Referring to FIG. 6B, it is found that a position corresponding to a skin-color portion of the face can be detected. For example, a portion P having a very low luminance and corresponding to hair is detected first, a portion Q adjacent to the portion P and having a high luminance is searched. At this time, the portion Q is estimated as a skin-color portion of the face. Therefore, the luminance signals of the three colors, i.e., R, G, and B, of the portion Q are extracted.

The second embodiment of the present invention will be described below. In this embodiment, the same reference numeral in the first embodiment denote the same parts as in the second embodiment, and a description thereof will be omitted.

FIG. 7 is a block diagram showing another arrangement of a video ID photo printing apparatus according to the present invention. The video ID photo printing apparatus in FIG. 7 is obtained such that a image data file memory 72, a character data file memory 72, a character data file memory 74, and a bus controller 76 are additionally arranged in the video ID photo printing apparatus shown in FIG. 2.

The image data file memory 72 which can store and retrieve a video image is connected to a frame memory 30. The character data file memory 74 is used as a video image filing means for storing and retrieving character data.

The bus controller 76 controls transfer of data of the image data file memory 72 to the frame memory 30 or to a look-up table 60 and controls connection of the output terminal of the look-up table 60 to the frame memory 30. In addition, the bus controller 76 is connected to the frame memory 30 such that image data obtained by the photographic operation of the color TV camera 26 can be recorded, stored, and directly transferred from the frame memory 30. The bus controller 76 is connected to a detected complexion memory 54 such that complexion data can be extracted from an original image read from the frame memory 30. In addition, a complexion converting look-up table 60 formed by comparing the complexion data with predetermined desired complexion standard color data is connected to the frame memory 30 through the bus controller 76.

The above control operations are performed by a controller 38. An arrangement of other parts is the same as that of the first embodiment.

An operation of the second embodiment will be described below. Although this operation is substantially the same as that of the above-described first embodiment, the video image filing means for recording and storing a picked-up still image is used in the second embodiment. In the second embodiment, upon a photographic operation, image data in the frame memory 30 is transferred to the image data file memory 72 and recorded therein under the control of the controller 38 first. During this recording operation, a file is arranged such that ID numbers, names, and character data are related to each other to be easily retrieved later. That is, the character data are recorded in the character data file memory 74. Characters are input such that an operator enters the characters with a keyboard 42.

When a face image is monitored by a monitor TV 36 or printed for an ID card, and an operator enters a retrieving keyword such as characters of an ID number or a name with the keyboard 42, the controller 38 retrieves a corresponding image file from the image data file memory 72. The image data are transferred to the frame memory 30 or the look-up table 60 through the bus controller 76. At the same time, character data related to the image data from the character data file memory 72 is loaded in the controller 38 and displayed on a monitor TV 40.

The above operation is commonly performed in a case wherein face image data are directly used.

A case wherein complexion data is converted will be described below.

When complexion data of a face image which is stored in the image data file memory 72 in advance is to be converted, a face image to be converted is transferred to the frame memory 30 in the same retrieval as described above, a portion in which complexion data to be detected is designated by a mouse controller 44 while a cursor (not shown) on the monitor TV 36 is observed. Thereafter, the image data are read from the image data file memory 72 again, and data at the designated address is transferred to the detected complexion memory 54. This operation can be performed such that data is transferred from the frame memory 30 to the detected complexion memory 54 through the bus.

This complexion data is compared with desired skin-color data stored in the standard color memory 56 by a comparator 58, thereby forming the look-up table 60 for converting complexion data. After the look-up table 60 is formed, a data signal from the image data file memory 72 is supplied to the look-up table 60 by the bus controller 76, the complexion data is converted in the look-up table 60, and an output therefrom is transferred from the bus controller 76 to the frame memory 30. The complexion data of a face image read from the video image filing unit is converted into desired complexion data, and a printing operation for an ID card is performed by a full-color video printer 34. The above sequential operations are performed under the control of the controller 38. Although a method in which the filing unit is additionally arranged is described above, the same effect as in this method can be obtained in the first embodiment.

The third embodiment of the present invention will be described below.

Figure 8:
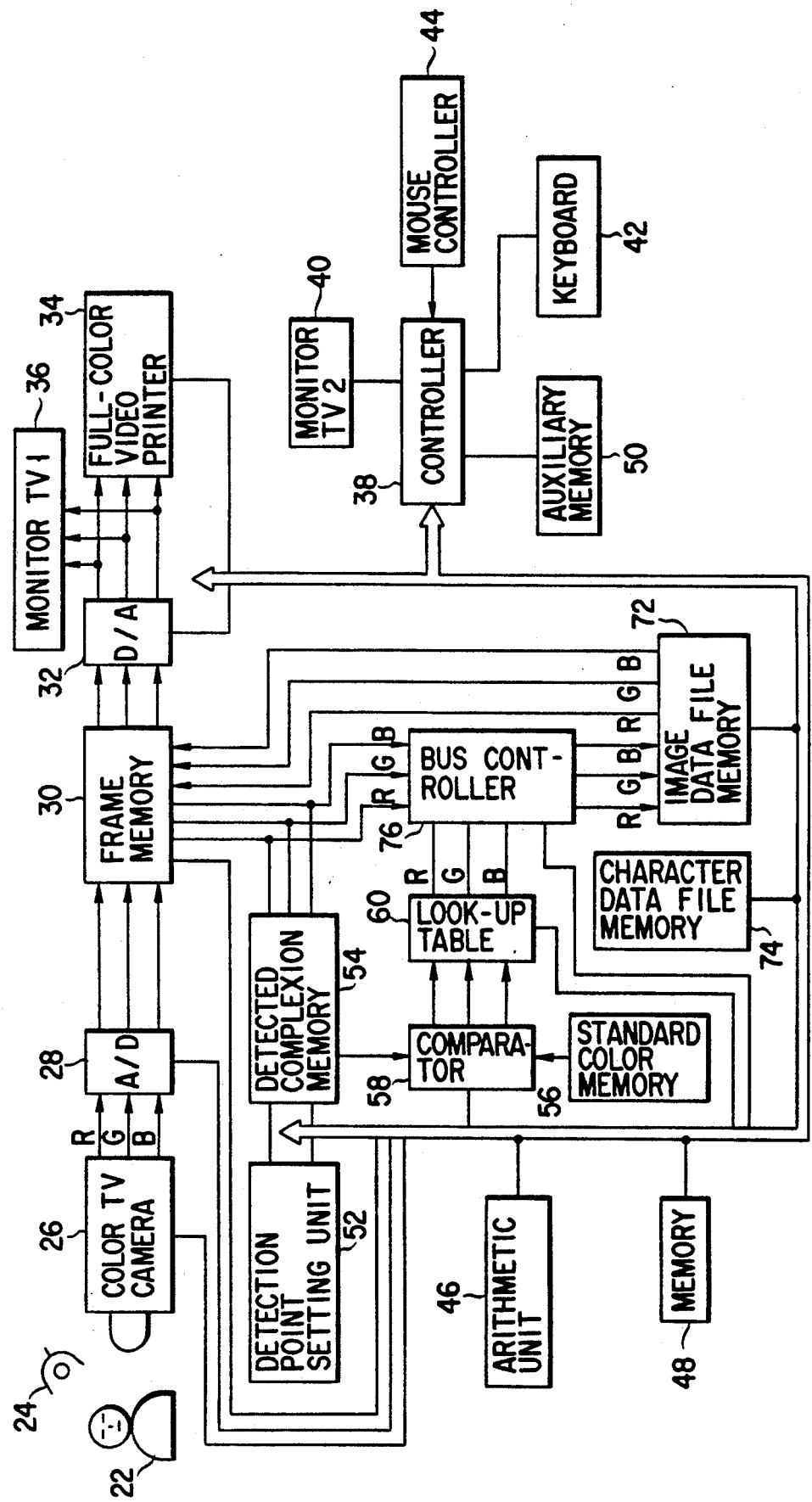
FIG. 8 is a block diagram showing an arrangement of a video ID photo printing apparatus according to the third embodiment of the present invention.

A video ID photo printing apparatus shown in FIG. 8 has the same constituting elements as those of the second embodiment in FIG. 7 but has the following different points. That is, the video ID photo printing apparatus in FIG. 8 is arranged such that complexion data of image data of a frame memory 30 can be converted and transferred to an image data file memory 72. In addition, the video ID photo printing apparatus is arranged such that the image data of the frame memory 30 can be directly transferred to the image data file memory 72, and the data is directly transferred to the frame memory 30 while image data in the image data file memory 72 are read out. When the image data are directly stored in the image data file memory 72, the same method as described above is used. Therefore, in the third embodiment, an operation in which image data including converted complexion data are stored in the image data file memory 72 will be described below.

It is assumed that a picked face image is present in the frame memory 30, the complexion data of the face image is converted first. As in the above-described first embodiment, a portion in which complexion data is to be detected is designated by a mouse controller 44 while a cursor (not shown) is observed on a monitor TV 36. The designated complexion data at coordinates is transferred to a detected complexion memory 54 and temporarily stored therein. The complexion data is compared with desired skin-color data in a standard color memory 56 by a comparator 58, and a look-up table 60 for converting the complexion data is formed. After the look-up table 60 is formed, the bus controller causes the image data from the frame memory 30 to be transferred to the look-up table 60. The data including the complexion data converted by the look-up table 60 are transferred from the bus controller 76 to the image data file memory 72 and stored therein. The above sequential operations are performed under the control of a controller 38.

The complexion of a photographed person 22 is converted into a desired complexion, and the face image of the person 22 is stored in a video image filing unit. In order to use this face image as an ID photo, when the data of the face image are read out from the video image filing unit, a printing operation for an ID card is immediately performed by a full-color video printer 34. Although the method in which a filing unit is additionally arranged is described above, the same effect as in this method can be obtained in the first embodiment.

When image signals are directly printed, the printing operation is performed with skin colors which are largely different from preferably received stored colors or standard colors due to a change in illumination condition during a photographic operation of a video image and inappropriate control operations of the color balance, an aperture value of the lens, and the like of a video image pickup apparatus. However, according to the video ID photo printing apparatus as described above, image signals can be converted into image signals capable of obtaining a print having a preferable complexion by performing converting and calculating operations.

In a video face image handled in the above-described video ID photo printing apparatus or on the basis of a portrait or the like, it is most important that the complexion of a person serving as an object is appropriate and that an operation and handling for keeping the appropriate complexion can be easily performed.

Although a video face image signal is directly related to the complexion of a portrait displayed on a video print or a monitor, the video face image signal is changed due to influences of an illumination light source used for picking up a face image or controlling operations of a video image pickup apparatus.

For example, in a video camera, when the control of white balance and an auto iris operating state are changed, the color of a video face image, i.e., a color tone, brightness, or the like, is changed. In addition, as changeable factors except for those in the video camera, there are a change in illumination light source and a change in complexion due to individual differences.

On the other hand, as a complexion felt comfortable, a real color is not faithfully reproduced, but a stored color felt comfortable is expressed. This preferable complexion is changed depending on sexes, races, and a degree of suntan. That is, reproduced colors of preferable faces vary depending on sexes, races, and individual differences.

Although various changes and changeable factors are present, it is very difficult to easily and stably obtain a preferable complexion.

For this reason, according to the fourth embodiment, the present invention is applied to a complexion converting apparatus in which a face image having a preferable color tone can be stable expressed on a print or a monitor. The forth embodiment will be described below.

Figure 9:
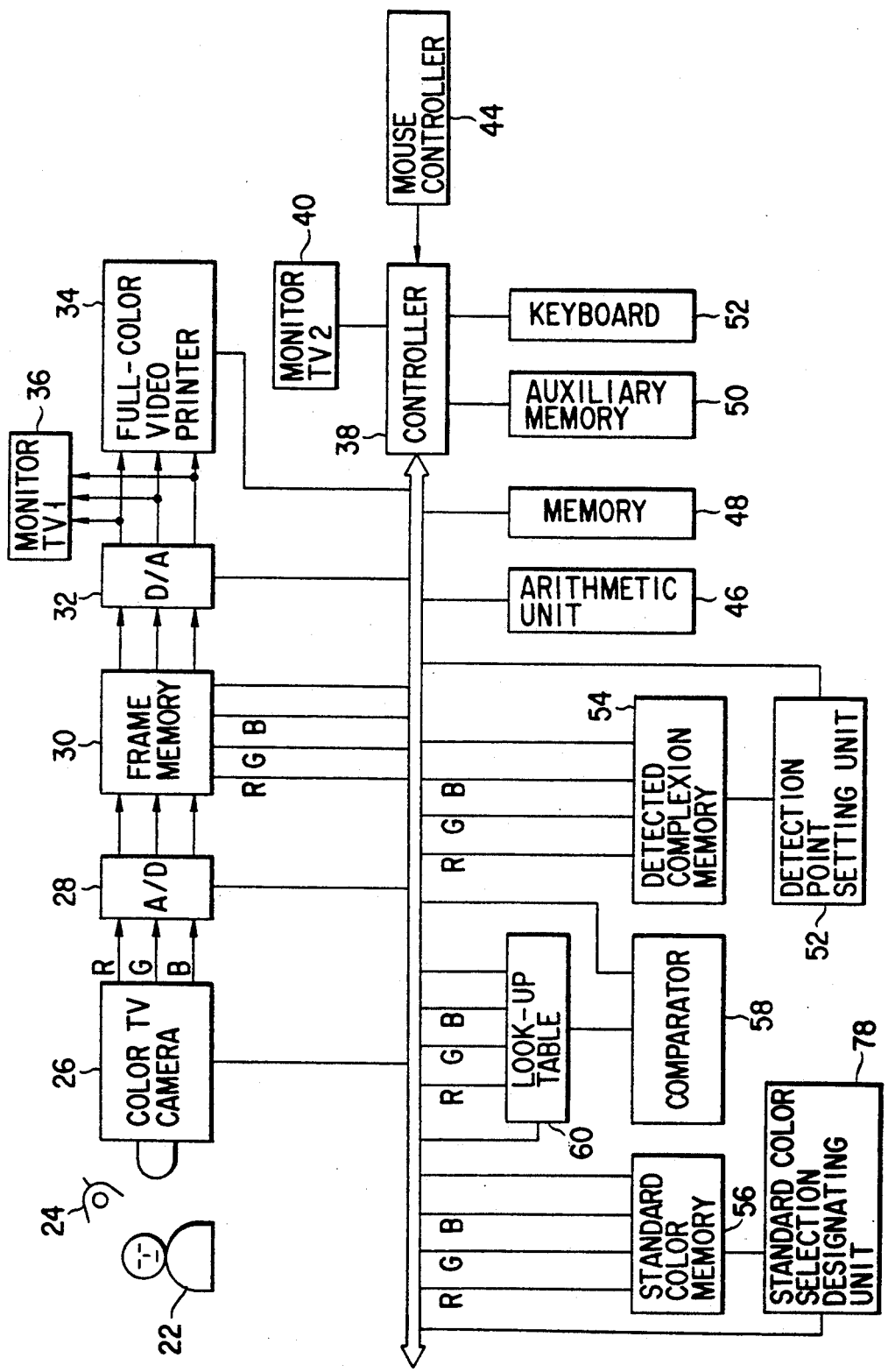
FIG. 9 is a block diagram showing an arrangement of a complexion converting apparatus according to the fourth embodiment of the present invention.

FIG. 9 is a block diagram showing an arrangement of a complexion converting apparatus to which the present invention is applied. The complexion converting apparatus in FIG. 9 is arranged such that a standard color selection designating unit 78 for selectively designating one of standard colors is additionally connected to the signal bus of a controller 38 in the video ID photo printing apparatus of FIG. 2. The arrangement and operation of other parts are the same as those of the above-described first to third embodiments, and a description thereof will be omitted.

In order to record and store the still image of the face of a person 22, image data stored in a frame memory 30 is transferred to an auxiliary memory 50 and stored therein. In an operation of the complexion converting apparatus, pixel unit data of image data of each of the colors, i.e., R, G, and B, in the frame memory 30 are read out by the controller 38, and the pixel unit data are sequentially transferred to the auxiliary memory 50 through a data bus. On the auxiliary memory 50 side, the data ar sequentially recorded on a recording medium. In this case, file name data, image information data, and the like are set to be able to be recorded in a file format to easily read out the data later. In addition, it is convenient that a code for selectively designating one of standard colors is included in the image information data. For example, file names are input as follows. After, the file names are converted into data which can be entered by an operator with a keyboard 42, i.e., ASCII-coded data, the data are stored in the auxiliary memory 50 by the controller 38.

When the stored face image data are to be read, the file name of an image which is required to be read by an operator is entered with the keyboard 42, and the image data of the file name are searched and read from the auxiliary memory 50 by the controller 38. The readout data are sequentially written in the frame memory 30 every pixel and every color through the data bus, or one of standard colors is designated to the standard color selection designating unit 78.

The conversion parameter of the data written in the frame memory 30 is determined in accordance with a designating code from the standard color selection designating unit 78, and the data is subjected to a complexion converting process. Thereafter, the data can be visually recognized as an image by an printing operation of a full-color video printer 34 or the CRT display of a monitor TV 36.

Standard colors which are designated by the standard color selection designating unit 78 will be described below.

With respect to an extracted complexion, R, G, and B data of a plurality of desired skin colors are stored in a standard color memory 56 in advance, or data stored in the auxiliary memory 50 in advance are read by the controller 38 to be stored in the standard color memory 56 through the data bus.

Three to five colors are prepared as the types of complexions serving as standard colors, numbers or characters representing the standard colors are assigned to codes, and the colors are preferably handled by the codes. The standard colors are prepared as follows. Blacks changed in accordance with races or degrees of suntan are designated, e.g., the complexion is preferably changed in three degrees. In this case, the print looks better than that using one standard color. In addition, when a printing operation is performed using a complexion which is changed in five degrees by adding color tone differences caused by differences in sex, the print can satisfy the needs of a normal ID photograph.

This complexion converting apparatus has codes which designate the standard colors, and color tone data corresponding to the codes are registered in the standard color memory. The data can be obtained by, as will be described later, R, G, and B representing average color densities, signal strengths of C, M, and Y, or hue and lightness.

A look-up table 60 serving as a means for converting an extracted complexion into a designated standard skin color is formed as follows. One of groups each having R, G, and B data and stored in a detected complexion memory 54 and a group stored in the standard color memory 56 in accordance with the designation of the standard color selection designating unit 78 are read out and compared with each other by a comparator 58 and then the look-up table 60 is formed by the controller 38.

After this look-up table is formed, image data stored in the frame memory 30 are sequentially read in units of pixels. The data are converted in density every color in accordance with the look-up table 60 and written at the address of the frame memory 30 in which the data are originally stored, thereby converting the data into a face image having a designated standard skin color. This operation is performed by the controller 38. Every time a person 22 is changed, the operation is performed to a standard color designated to each person.

In the above description, as a video image inputting apparatus, in addition to a video TV camera, a still video camera or the like using a floppy disk memory or a semiconductor card memory may be used. When complexion data are to be extracted, a plurality of position data are extracted and averaged to prevent sampling errors as a matter of course. In an sampling operation, when averaged data is sampled from a region having an area in place of point, an error occurring in the sampling can be prevented.

A method of calculating an extracted complexion, i.e., a method of calculating complexion conversion, will be described below with reference to FIG. 3.

Each pixel signal is constituted by a luminance signal corresponding to one of the three colors, i.e., R, G, and B. A value of the signal level of each pixel falls within a range of 0 to 255, the signal level 0 represents a minimum luminance, and the signal level 255 represents a maximum luminance. At this time, characteristics of color conversion are designated by two colors. One is color data extracted from each portrait data and is called a designated conversion color, and the other is color data arbitrarily designated, i.e., color data designated as a standard color, and is called a target color.

The designated conversion color is extracted from the portrait data first. Color conversion is performed using this designated conversion color as a center. The designated conversion color is extracted from the face portion of the portrait data. In the face, the color is preferably extracted from a portion such as a cheek or the forehead which determines the impression of the complexion. In addition, the signal levels of the three colors, i.e., R, G, and B, of the designated conversion color are set to be r0, g0, and b0, respectively.

The target color is selected and read out. As this target color, a plurality of colors suitable for the portion (cheek, forehead, or the like) from which the designated conversion color is extracted are prepared, and one of the colors is selectively designated. The signal levels of the three colors, i.e., R, G, and B, of the target color are set to be r1, g1, and b1, respectively.

The operations sequential to the above operations are the same as those of the first embodiment, and a description thereof will be omitted.

An operation using a mouse controller is the same as that in the first embodiment.

A standard color can be selectively designated during a complexion converting operation as described above, and the standard color is input simultaneously with the name or ID number of a person serving as an object. When the data are read out to display and print a portrait, a designated code is automatically selected. At this time, good operability can be obtained. In addition, when differences in sex are included in a reference for selecting a standard color, male or female data included in ID data is automatically applied, and the male or female data is not added to choices of standard colors. However, in practice, selection performed by differences in sex is automatically performed, such that an operation can be simplified.

Since a method in which complexion data are extracted such that coordinates are designated in advance is performed in the sam manner as in the first embodiment, a description of the method will be omitted.

The fifth embodiment of the present invention will be described below.

Figure 10:
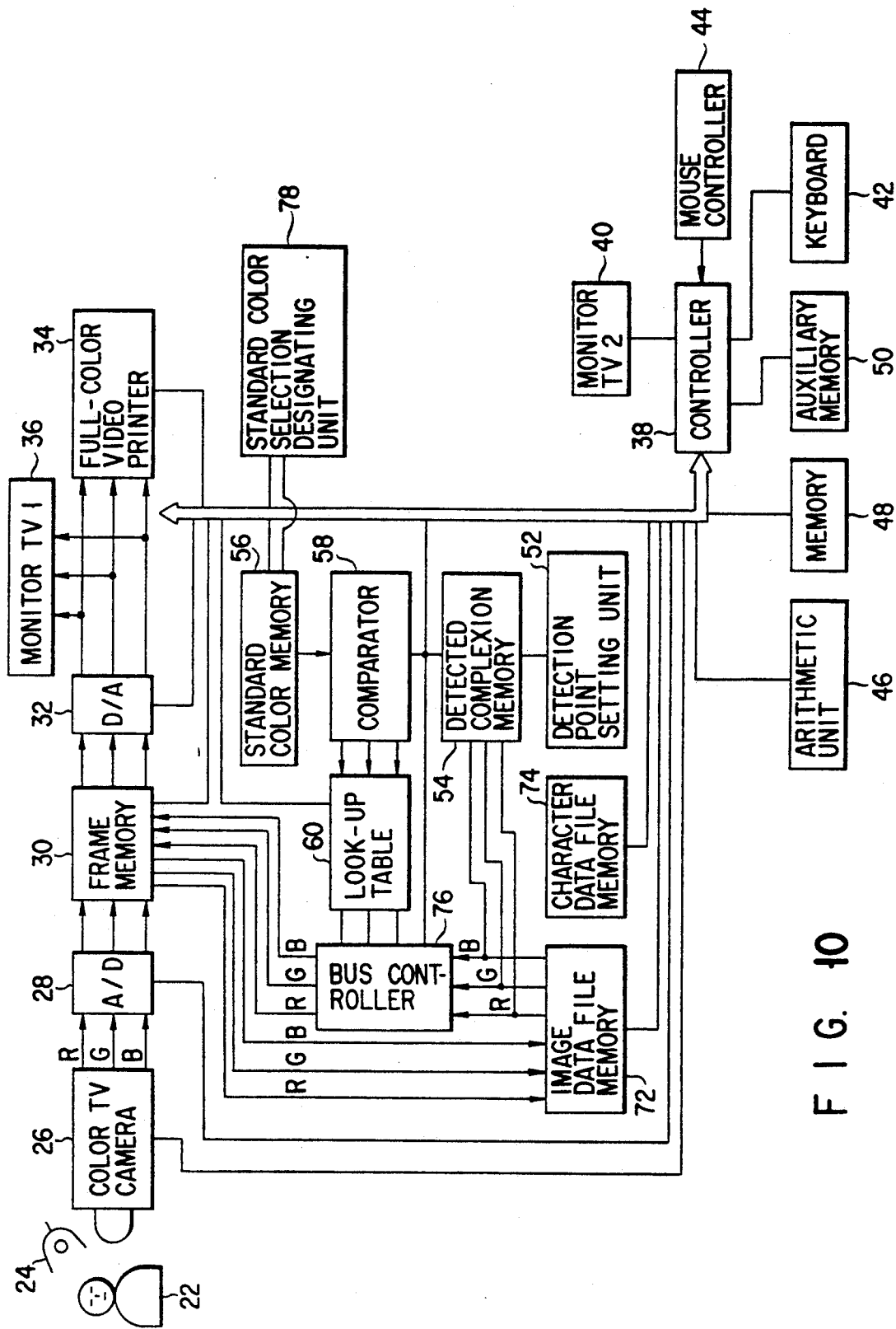
FIG. 10 is a block diagram showing an arrangement of a complexion converting apparatus according to the fifth embodiment of the present invention.

FIG. 10 is a block diagram showing another embodiment of a complexion converting apparatus according to the present invention. The complexion converting apparatus in FIG. 10 is obtained such that an image data file memory 72 is connected to a frame memory 30 in the complexion converting apparatus of FIG. 9. A character data file memory 74 and a bus controller 76 are arranged as means for filing video images. In addition, the bus controller 76 is connected to the frame memory 30 such that image data obtained by the photographic operation of the color TV camera 26 can be recorded, stored, and directly transferred from the frame memory 30. The bus controller 76 is connected to a detected complexion memory 54 such that complexion data can be extracted from an original image read out from the frame memory 30. In addition, a complexion converting look-up table 60 formed by comparing the complexion data with desired complexion standard color data which is set and selected in advance is connected to the frame memory 30 through the bus controller 76.

Codes each of which designates one of standard complexions every person are stored in the character data file memory 74. This control is performed by a controller 38. Arrangements of other elements are the same as those of the fourth embodiment.

Parts of an operation of the fifth embodiment different from the fourth embodiment will be described below. In the fifth embodiment, a video image filing means for recording and storing picked still images is arranged. During a photographic operation, ID numbers, names, and the like are related to character data, arranged in a file, and recorded in the file memory 72 to easily read out the data later. At the same time, a code for selectively designating one of standard colors is stored in the same memory.

On the other hand, when a face image is monitored on a monitor TV 36 or printed for an ID card, and an operator enters a retrieving keyword such as characters of an ID number or a name with a keyboard 42, the controller 38 retrieves a corresponding image file from the image data file memory 72. The image data is transferred to the frame memory 30 or the look-up table 60 through the bus controller 76. At the same time, character data related to the image data from the character data file memory 72 is loaded in the controller 38 and displayed on a monitor TV 40. In addition, a code which selects a standard complexion is read out and transferred to a standard color selection designating unit 78.

A case wherein complexion data is converted will be described below.

When complexion data of a face image which is stored in the image data file memory 72 in advance is to be converted, a face image to be converted is transferred to the frame memory 30 in the same retrieval as described above and designated by a mouse controller 44 as in the fourth embodiment. Data of designated coordinates is read out and transferred to the detected complexion memory 54. This operation can be performed such that the data is transferred from the frame memory 30 to the detected complexion memory 54 through the bus. A comparator 58 compares this complexion data with skin color data selectively designated from data stored in the standard color memory 56.

The sixth embodiment of the present invention will be described below.

Figure 11:
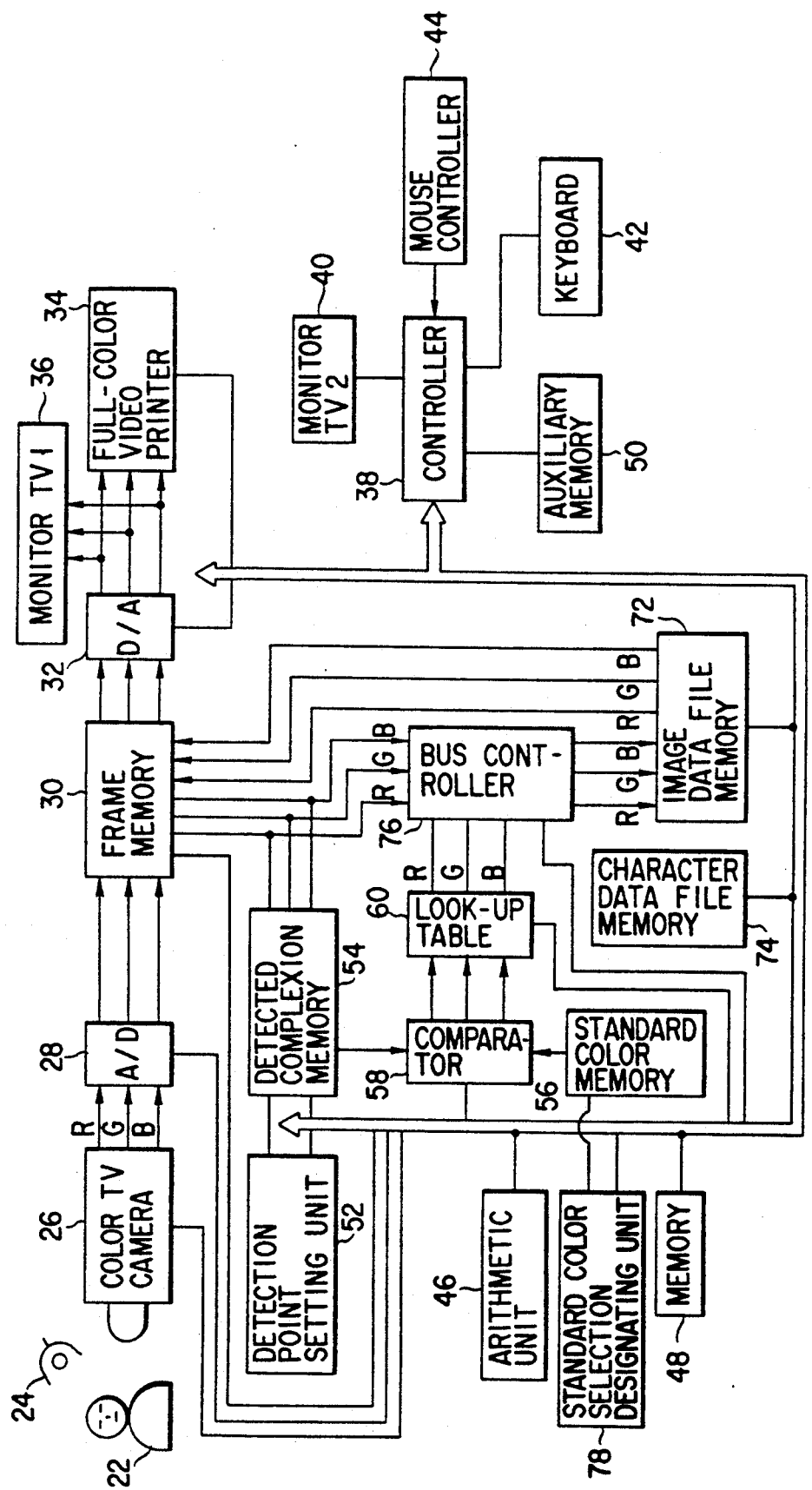
FIG. 11 is a block diagram showing an embodiment of a complexion converting apparatus according to the sixth embodiment of the present invention.

The complexion converting apparatus shown in FIG. 11 has the same constituting elements as those of the above third embodiment shown in FIG. 8. In the complexion converting apparatus of FIG. 11, unlike the apparatus of FIG. 8, a standard color selection designating unit 78 for selectively designating one of standard colors is connected to the signal bus of a controller 38.

An operation for storing image data having converted complexion data in an image data film memory 72 will be described below. It is assumed that picked face image data are stored in a frame memory 30, and the complexion data of the image data is converted first. As shown in the fourth embodiment, a portion in which the complexion data is detected is designated by a mouse controller 44. The complexion data at the designated coordinates is transferred to a detected complexion memory 54 and temporarily stored therein. A comparator 58 compares the complexion data with skin-color data selectively designated from a standard color memory 56, thereby forming a look-up table 60 for converting complexion data.

After the look-up table 60 is formed, image data from the frame memory 30 are transferred to the look-up table 60 by a bus controller 76. The data having complexion data converted by the look-up table 60 are transferred from the bus controller 76 to the image data file memory 72 and stored therein. The above sequential operations are performed by the controller 38. Therefore, the complexion of the picked image of a person 22 is converted into a desired complexion, and the image data are stored in a video image filing unit. In order to use the face image as an ID photo, only when the image data are read from the video image filing unit, the face image is printed for an ID card by a full-color video printer 34. In this arrangement, a method using an independently arranged filing unit is described. However, the same operation as described above can be performed in the fourth embodiment.

As described above, in the complexion converting apparatus, when image signals are directly printed, the printing operation is performed with complexions which are largely different from preferably received stored colors or standard colors due to a change in illumination condition during a photographic operation of a video image and to inappropriate control operations of the color balance, an aperture value of the lens, and the like of a video image pickup apparatus. However, according to the video ID photo printing apparatus as described above, image signals can be converted into image signals capable of obtaining a monitor display or a print having a preferable complexion by performing converting and calculating operations.

Additional advantages and modifications will readily occur to those skilled in the art. Therefore, the invention in its broader aspects is not limited to the specific details, and representative devices shown and described herein. Accordingly, various modifications ma be made without departing from the spirit or scope of the general inventive concept as defined by the appended claims and their equivalents.

What is claimed is:

1. A video ID photo printing apparatus comprising:
   video image pickup means for photographing an object and for outputting video original image data;
   address designating means for designating an address corresponding to a complexion data portion of the video original image data, said complexion data portion corresponding to a skin tone portion of the photographed object;
   extracting means for extracting color data from the video original image data at the designated address corresponding to the complexion data portion, the extracted color data comprising conversion-designated color data;
   storage means for storing standard color data representing a predetermined standard complexion;
   comparing means for comparing the conversion-designated color data with said standard color data stored in said storage means;
   complexion conversion arithmetic means, having a conversion parameter determined by a comparison result obtained from said comparing means, for converting, as a function of said conversion parameter, color data for all pixels of the video original image data into a converted video image signal; and
   a full-color video printer for printing an image corresponding to said converted video image signal.

2. A video ID photo printing apparatus according to claim 1, wherein said address designating means includes a detection point-setting section for designating an address of a fixed point in the video original image data.

3. A video ID photo printing apparatus according to claim 1, wherein:
   said address designating means includes a detection point-setting section for designating a plurality of predetermined addresses of the video original image data; and
   said extracting means calculates average data of the color data of pixels extracted from the addresses designated by the address designating means, and uses the calculated average data as said conversion-designated color data.

4. A video ID photo printing apparatus according to claim 1, wherein said complexion conversion arithmetic means includes:
   means for converting the conversion-designated color data into a standard color; and
   means for performing color conversion with respect to the entire image to be printed such that the more the conversion-designated color data deviates from color data not corresponding to a complexion data portion, the smaller is the amount of conversion performed.

5. A video ID photo printing apparatus according to claim 1, wherein:
   said storage means stores a plurality of standard complexion data;
   said video ID photo printing apparatus further comprises means for designating one of the stored standard complexion data; and
   said comparing means compares one conversion-designated color data extracted by the extracting means with one standard color data.

6. A video ID photo printing apparatus according to claim 1, wherein said address designating means extracts image data from the video original image data along a line designated beforehand, and includes means for identifying a facial image portion included in the extracted image data, and means for automatically determining an address from which complexion data is extracted.

7. An apparatus according to claim 6, further comprising:
   monitor means for displaying an image; and
   position designating means for designating an arbitrary portion on the image displayed on said monitor means; and
   wherein said extracting means includes means for extracting the complexion data from said video original image at the arbitrary portion of the image displayed on said monitor means.

8. An apparatus according to claim 1, further comprising:
   monitor means for displaying an image; and
   position designating means for designating an arbitrary portion on the image displayed on said monitor means; and
   wherein said extracting means includes means for extracting the complexion data from said video original image at the arbitrary portion of the image displayed on said monitor means.

* * * * *